United States Patent
Suzuki et al.

(10) Patent No.: US 6,601,870 B2
(45) Date of Patent: Aug. 5, 2003

(54) TEAR STRUCTURE OF AIR BAG DOOR

(75) Inventors: Hiroaki Suzuki, Aichi (JP); Tomokazu Hisadome, Aichi (JP); Toshiyasu Funato, Aichi (JP); Akihiko Murakami, Aichi (JP)

(73) Assignee: Inoac Corporation, Aichi (JP)

( * ) Notice: Subject to any disclaimer, the term of this patent is extended or adjusted under 35 U.S.C. 154(b) by 28 days.

(21) Appl. No.: 09/843,648

(22) Filed: Apr. 27, 2001

(65) Prior Publication Data

US 2002/0005630 A1 Jan. 17, 2002

(30) Foreign Application Priority Data

Apr. 28, 2000 (JP) ........................................ 2000-131702
Apr. 28, 2000 (JP) ........................................ 2000-131703

(51) Int. Cl.[7] ............................................. B60R 21/20
(52) U.S. Cl. ................................ 280/728.3; 280/728.2; 280/732
(58) Field of Search ..................... 280/728.2, 728.3, 280/732; 282/743.1

(56) References Cited

U.S. PATENT DOCUMENTS

| | | | | |
|---|---|---|---|---|
| 5,437,469 A | * | 8/1995 | Monden | 280/728.3 |
| 5,439,246 A | | 8/1995 | Ravenberg et al. | 280/728.3 |
| 5,533,746 A | * | 7/1996 | Whited | 280/728.2 |
| 5,611,564 A | * | 3/1997 | Bauer | 280/728.3 |
| 5,615,908 A | * | 4/1997 | Phillion et al. | 280/728.3 |
| 5,741,024 A | * | 4/1998 | Enders | 280/728.3 |
| 5,961,142 A | * | 10/1999 | Shiraki et al. | 280/728.3 |
| 6,082,760 A | * | 7/2000 | Ukai et al. | 280/728.3 |
| 6,378,894 B1 | * | 4/2002 | Trevino et al. | 280/728.3 |
| 6,460,876 B1 | * | 10/2002 | Nishijima | 280/728.3 |

FOREIGN PATENT DOCUMENTS

| | | | | |
|---|---|---|---|---|
| DE | 197 35 438 A1 | 2/1999 | | B60R/21/20 |
| WO | 99/46152 | 9/1999 | | B60R/21/20 |

* cited by examiner

*Primary Examiner*—Paul N. Dickson
*Assistant Examiner*—Toan C To
(74) *Attorney, Agent, or Firm*—Sughrue Mion, PLLC

(57) ABSTRACT

Movable reinforcing panels (31) are respectively formed with a plurality of serially-combined panel members (31*a*) disposed along bending lines of opening door panels (13, 14). The panel members (31*a*) are coupled together deformably with a ranging portion (33) for partially coupling together the end edge portions of the adjoining panel members (31*a*) and fitted to a fixing bracket (26) via coupling members (32). When an air bag starting to inflate presses any one of the panel members (31*a*) of the movable reinforcing panels (31) upward after an air bag system is operated, regions corresponding to the movable reinforcing panels (31) of the door panels (13, 14) are deformed outward. Thus, tear seams (15, 16) situated closest to the deformed regions are first caused to partially rupture and then these tear seams (15, 16) are totally ruptured.

14 Claims, 12 Drawing Sheets

FIG. 7A
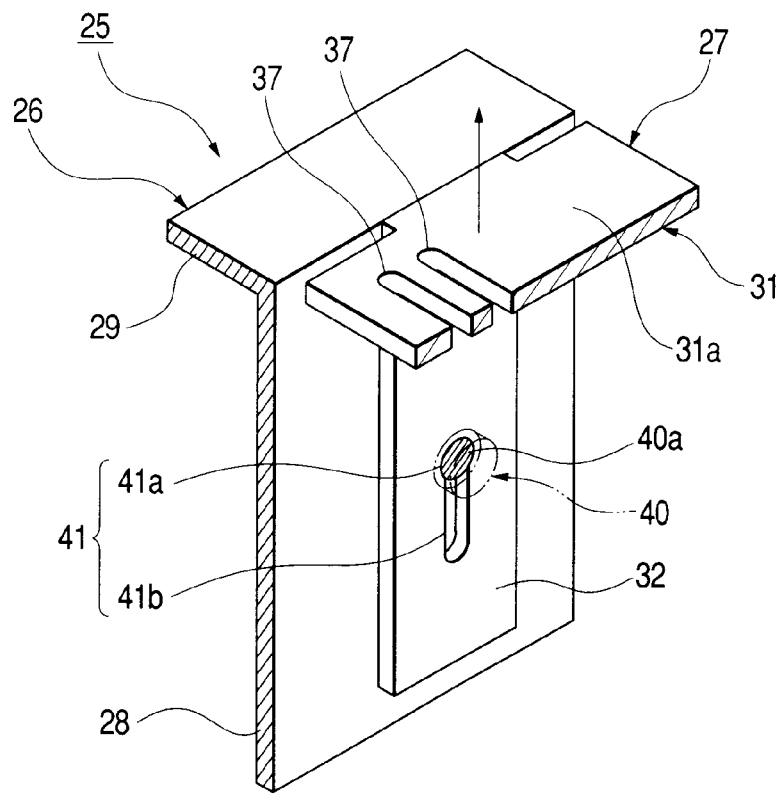
FIG. 7B
FIG. 7C
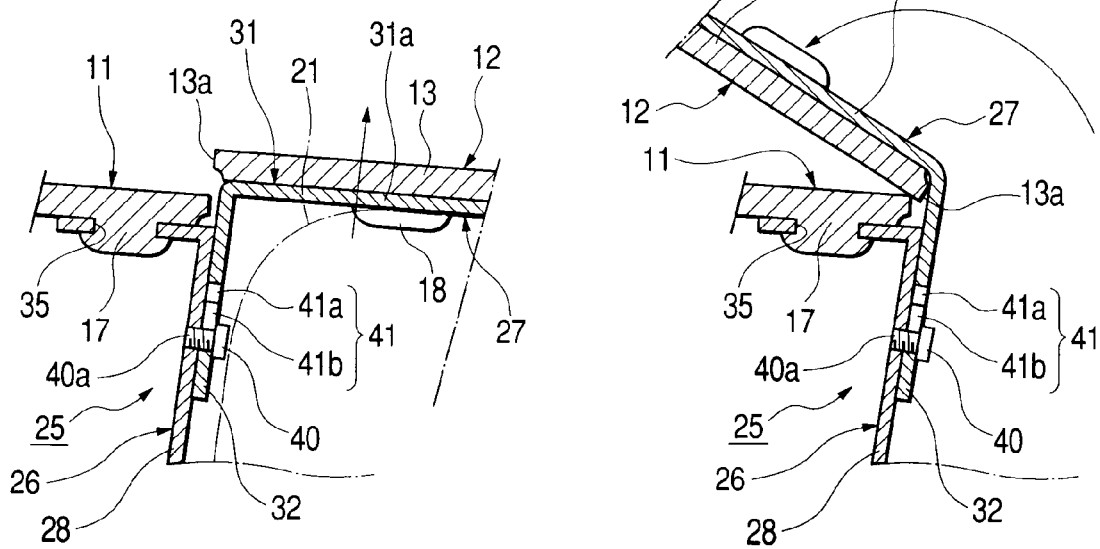

US 6,601,870 B2

TEAR STRUCTURE OF AIR BAG DOOR

BACKGROUND OF THE INVENTION

1. Field of the Invention

The present invention relates to a tear structure of an air bag door and more particularly to a tear structure comprising two sheets of door panels which are formed integrally with the base of the upholstery member of a vehicle and open to both sides when an air bag system is actuated and two sheets of movable reinforcing panels which are fitted to a bracket disposed on the back side of the base in such a manner as being openable to both sides and fixed correspondingly to the door panels, wherein when an air bag starting to expand simultaneously with the operation of the air bag system presses the movable reinforcing panels from the inside, there occurs the rupture of tear seams formed along the center line where the two sheets of adjoining door panels meet and along the outer edge lines thereof to timely open the door panels toward a passenger's chamber.

2. Description of the Related Art

In recent years, almost all passenger cars are normally equipped with air bag systems for car drivers' and front passengers' seats in order to protect on-board persons from impacts due to collisions and the like. The air bag system for the car driver's seat is usually installed in a horn pad portion in the center of a steering wheel. However, as shown in FIGS. 10 and 11, for example, the air bag system for the front passenger's seat is installed in such a way that it is housed inside an instrument panel 10 as a vehicle upholstery member that is located in front of the passenger's seat and incorporated in the forepart of a passenger's chamber 45. Therefore, an air bag door 12 to be opened and displaced toward the passenger's chamber 45 is separately mounted or integrally formed in a region corresponding to the air bag system 20 for the passenger's seat in the panel base 11 of the instrument panel 10. When the door 12 is released from the panel base 11, an open partition toward the passenger's chamber 45 is formed. More specifically, when the air bag system 20 operates on sensing an impact due to a collision, an inflated air bag 21 forces the air bag door 12 to open from the inside and develops into the passenger's chamber 45 via the open partition.

Heretofore, it has been a common practice that the air bag door 12 is separately formed from the panel base 11 of the instrument panel 10 and mounted therein. In recent years, however, the number of air bag doors 12 integrally formed with the respective panel bases 11 is on the increase. In other words, the air bag door 12 usually forms a design surface as part of the panel base 11 as shown in FIGS. 10 and 11 and when the air bag door 12 receives the pressing force from the inflating air bag 21 after the air bag system 20 operates, rupture occurs along tear seams 15 and 16 that are provided in the panel base 11 beforehand, so that the tear seams 15 and 16 are separated from the panel base 11 and allowed to open. With respect to the form of the air bag door 12, there are, for example, a one-side opening type having one door panel portion, a both-side opening type (as shown in the drawings) having two sheets of door panels and so forth. In any one of the types, however, an important matter is not to hinder the smooth development of the air bag 21 expected to take approximately $\frac{1}{100}$ second from beginning to completion of its inflation.

As the panel base 11 integrally forming the air bag door 12 is generally a synthetic resin molded material of polypropylene or the like, the panel base 11 itself including the air bag door 12 may be damaged by an impact resulting from receiving strong pressing force from the air bag 21 particularly at low temperatures (below zero) and there is immanent possibility of developing problems in view of its strength and safety. Consequently, measures to increase the strength by fitting a metal reinforcing member 25, for example, by caulking to the periphery of the air bag door 12 on the back side of the panel base 11 in order to prevent the air bag door 12 from being damaged and scattered off.

On condition that the both-side opening type air bag door 12 having the two sheets of door panels 13 and 14 is employed, the metal reinforcing member 25 includes, as shown in FIGS. 11, 12 and 13A, a rectangular frame-like fixing bracket 26 fixed in such a manner as to surround the edged tear seam 16 formed along the outer edge lines of the door panels 13 and 14 formed on the panel base 11, and movable brackets 27 and 27 mounted face-to-face on the inner side of the opening of the fixing bracket 26. The fixing bracket 26 includes a tubular portion 28 for retaining and holding the air bag system 20, and a retaining plate portion 29 that is integrally molded to the tubular portion 28 and fitted by caulking to the back side of panel base 11. Further, the movable brackets 27 and 27 correspond to the respective door panels 13 and 14 of the air bag door 12, each of the movable brackets 27 and 27 including fixing support panels 30 fitted by welding or machine screws to the tubular portion 28 of the fixing bracket 26, and movable reinforcing panels 31 that are pivotally joined to the respective fixing support panels 30 and also joined by caulking to the undersides of the corresponding door panels 13 and 14. With the panel base 11 for mounting the metal reinforcing member 25, the door panels 13 and 14 and the outer peripheral portions of the air bag door 12 are reinforced thereby so that the panel base 11 may become strong enough to sufficiently resist the strong pressing force generated by the inflation of the air bag 21.

Incidentally, the conventional idea about the air bag door 12 was to attempt to increase the strength of the air bag door 12 itself by means of the metal reinforcing member 25, and the chief aim of this was to avoid the damage caused by the strong pressing force of the air bag 21. Therefore, the movable reinforcing panel 31 of the movable bracket 27 fixed to the underside of each of the door panels 13 and 14 has I-, L- or T-shaped reinforcing recessed portions 33 in proper places as shown in FIG. 12 whereby to prevent the deformation of each of the door panels 13 and 14 of the air bag door 12 by increasing the strength of the movable reinforcing panel 31 itself against bending, deflection and twisting as shown in FIG. 12. In this case, as the air bag 21 to be inflated through the operation of the air bag system 20 inflates in a spherical shape with the center of its upper face being inflated as shown in FIG. 10, the strongest pressing force is applied to the vicinity of the center (substantially central region of the central tear seam 15) between the opposed edge portions of the movable reinforcing panels 31 and 31 fixed to the underside of the air bag door 12. However, because the movable reinforcing panels 31 and 31 are almost free from deformation against the pressing force of the air bag 21, substantially equal push-up force is applied to the whole surface of the corresponding door panels 13 and 14.

When the air bag 21 starts inflating at the initial pressing stage, both the door panels 13 and 14 of the air bag door 12 are pushed up substantially without being bent-deformed, and the central tear seam 15 formed along the center line between the adjoining door panels 13 and 14 and the edged tear seam 16 formed along the outer edge lines are totally and simultaneously ruptured (sheared), so that partial rupture hardly occurs. As is well known, however, the force needed to rupture the tear seams 15 and 16 totally and simultaneously is far greater than what is needed to partially rupture part of the tear seams 15 and 16 first and then to make the rupture extend to the whole. Therefore, because no rupture of the tear seams 15 and 16 occurs unless the internal pressure of the air bag 21 rises with the proper passage of time and unless an increase in the pressing force follows, the completion of the total rupture will be delayed even though the delay happens in a moment. The delay in rupturing the tear seams 15 and 16 at this time results in delaying the opening and displacement of the air bag door 12, which means that as the smooth inflation of the air bag 21 is obstructed, the overall development of the air bag 21 toward the passenger's chamber 45 is also delayed. In case where the development of the air bag 21 does not progress properly, the air bag system does not function as a safety system and poses an extremely serious problem in that it is unable to ensure safety of the passenger.

The internal pressure of the air bag 21 has so considerably risen at the beginning of the rupture of the tear seams 15 and 16, that, greater pressing force than usual is applied to the air bag door 12, and the periphery of the air bag door 12 (the panel base 11) may be damaged by the rupture thereof without suitable rupture propagation along the tear seams 15 and 16. In such a case as that, any part without being fixed to the metal reinforcing member 25 will be damaged and in case where the part is reduced to broken pieces, a new problem of causing the broken pieces to scatter behind the passenger's chamber and to collide with the passenger will also be pointed out. Further, there is the possibility that the air bag door 12 itself may be blown off as the air bag door 12 is abruptly opened and displaced.

In addition, as shown in FIG. 13A, the movable brackets 27 and 27 in the conventional metal reinforcing member 25 is formed by only bending a movable reinforcing panel 31 at a bending fulcrum 38 with respect to the fixing support panel 30 and when the air bag 21 presses the movable reinforcing panel 31 upward, the movable reinforcing panel 31 is pivotally displaced round the bending fulcrum 38. As shown in FIG. 13B, however, in the air bag door 12 like this, the end portion 14a (13a) on the outer edge line side of the door panel 14 (13) fitted by caulking to the movable reinforcing panel 31 interferes with the panel base 11 and the inherent drawback is that as the opening and displacement of the door panel 14 (13) is restricted, the smooth overall development of the air bag 21 toward the passenger's chamber 45 is not ensured. When the air bag 21 forcibly presses the movable reinforcing panel 31 upward, moreover, the interference of the end portion 14a (13a) causes the door panel 14 (13) to be pushed in the direction of an arrow in FIG. 13B. Consequently, it is feared that the door panel 14 (13) may be isolated from the movable reinforcing panel 31 and scattered.

In order to avoid the inconvenience above, there has been proposed an arrangement of coupling the movable reinforcing panel 31 to each fixing support panel 30 with an extendable deformable coupling member, a slidable coupling member or the like. When the air bag 21 presses the movable reinforcing panel 31 upward in such an improved air bag door, the edged tear seam 16 first ruptures simultaneously with the extension and deformation or sliding displacement of the coupling members to move the door panels 13 and 14 upward from the panel base 11. Then the central tear seam 15 ruptures whereby to open and displace each of the door panels 13 and 14. With the air bag door in the above form, the end portion 14a (13a) of the door panel 14 (13) fitted by caulking to the movable reinforcing panel 31 is prevented from interfering with the panel base 11 and this makes possible the opening and displacement of the door panel 14 (13). Thus, the smooth overall development of the air bag 21 toward the passenger's chamber 45 is never obstructed because the door panel 14 (13) is excessively opened.

Although the upward movement of the door panels 13 and 14 results in appropriately preventing the end portions 13a and 14a of the respective door panels 13 and 14 from interfering with the panel base 11 as long as the improved air bag door above is concerned, each of the door panels 13 and 14 pressed upward by the air bag 21 is opened and displaced with great force and there is developed a new problem of making the door panels 13 and 14 collide violently with the outer surface of the panel base 11. In other words, with the improved air bag door, the impact caused when the door panels 13 and 14 collide with the panel base 11 grows greater than before as the opening and displacement of the door panels 13 and 14 become entirely uncontrolled. Therefore, there inherently exists the possibility of rather increasing a degree of damaging the door panels 13 and 14 as well as the panel base 11.

SUMMARY OF THE INVENTION

An object of the present invention is to properly solve the foregoing problems and to provide a tear structure of an air bag door for allowing door panels to be smoothly opened and displaced and also allowing an air bag to be smoothly and totally developed by deformably forming movable reinforcing panels fixed to the undersides of the respective door panels so as to allow the partial deformation of the door panels when the door panels receive the pressing force of the air bag, and letting the total rupture of tear seams progress after the tear seams corresponding to the door panels are caused to partially rupture.

Another object of the present invention is to provide an air bag door opening structure for use in preventing door panels and a panel base from being damaged when the door panels are ruptured, separated and properly driven upward from the panel base while an air bag is inflating after an air bag system is actuated in order to open and displace the door panels by arranging each of the door panels pressed upward by the air bag so that the door panels may be stopped from opening before the door panels collide with the panel base.

In order to accomplish the object above, according to an aspect of the invention, there is provided a tear structure of an air bag door, wherein an air bag door comprises two sheets of door panels which are integrally formed with the panel base of a vehicle upholstery member and opened to both sides when an air bag system is actuated, and two sheets of movable reinforcing panels which are fitted to a bracket disposed on the back side of the panel base in such a manner as openable to both sides and fixed to the back sides of the corresponding door panels, wherein when an air bag starting to inflate after the air bag system is actuated presses the movable reinforcing panels upward from the inside, tear seams formed along a center line between the two sheets of adjoining door panels and along their outer edge lines rupture to open and displace the door panels toward a passenger chamber whereby to totally develop the air bag toward the passenger chamber, is characterized in that:

the movable reinforcing panels are respectively formed with a plurality of serially-combined panel members disposed along bending lines of opening the door panels and that when the air bag starting to inflate after the operation of the air bag system presses any one of the panel members upward in the movable reinforcing panels, regions corresponding to the panel members of the door panels are deformed outward and the tear seams situated closest to the deformed regions are caused to partially rupture in order to prompt the total rupture of these tear seams.

According to another aspect of the invention, there is provided an air bag door opening structure, wherein an air bag door comprises two sheets of door panels which are integrally formed with the panel base of a vehicle upholstery member and opened to both sides when an air bag system is actuated, and two sheets of movable reinforcing panels which are fitted to a bracket disposed on the back side of the panel base in such a manner as openable to both sides via coupling members each having a loosening portion and fixed to the back sides of the corresponding door panels and wherein when an air bag starting to inflate after actuating the air bag system presses the movable reinforcing panels upward from the inside, a tear seam formed along the outer edge lines of the door panels ruptures to move the door panels upward from the panel base as the loosening portions of the respective coupling members are extended and deformed and subsequently a central tear seam formed along the center line between the adjoining door panels ruptures to open and displace the door panels toward a passenger's chamber whereby to totally develop the air bag toward the passenger's chamber, which structure is characterized in that:

each of the coupling members is formed semi-arcuately so that the loosening portion is capable of being linearly extended and deformed, and both the arcuate ends of the loosening portion are positioned close to the inner wall surface of the tubular portion of the bracket;

the length of each extended loosening portion is set to position the door panels so as to prevent the door panels from obstructing the overall development of the air bag and also to allow the door panels to be opened and displaced up to a position where the door panels are prevented from colliding with the surface of the panel base; and when each of the door panels is opened after the air bag presses the movable reinforcing panels upward from the inside, the door panels are stopped from being opened and displaced at a point of time the loosening portions of the respective coupling members are completely extended whereby to prevent the door panels from colliding with the surface of the panel base.

According to still another aspect of the invention, there is provided an air bag door opening structure, wherein an air bag door comprises two sheets of door panels which are integrally formed with the panel base of a vehicle upholstery member and opened to both sides when an air bag system is actuated, and two sheets of movable reinforcing panels which are fitted to a bracket disposed on the back side of the panel base in such a manner as openable to both sides via coupling members slidably disposed for the bracket and fixed to the back sides of the corresponding door panels and wherein when an air bag starting to inflate after actuating the air bag system presses the movable reinforcing panels upward from the inside, a tear seam formed along the outer edge lines of the door panels ruptures to move the door panels upward from the panel base as the coupling members are slid and displaced and subsequently a central tear seam formed along the center line between the adjoining door panels ruptures to open and displace the door panels toward a passenger's chamber whereby to totally develop the air bag toward the passenger's chamber, which structure is characterized in that:

each of the coupling members is incorporated in the bracket by inserting a bar-like member through a slit extended along the sliding direction of the coupling member so that the bar-like member is allowed to slidably move from one end to the other end of the slit;

the length of each slit is set to position the door panels so as to prevent the door panels from obstructing the overall development of the air bag and also to allow the door panels to be opened and displaced up to a position where the door panels are prevented from colliding with the surface of the panel base; and when each of the door panels is opened after the air bag presses the movable reinforcing panels upward from the inside, the door panels are stopped from being opened and displaced as the coupling members slide and as the other end of each slit is brought into contact with the bar-like member whereby to prevent the door panels from colliding with the surface of the panel base.

BRIEF DESCRIPTION OF THE DRAWINGS

FIG. 7A is a perspective view of another embodiment of the coupling member.

FIG. 7B is a sectional side view of the air bag door fixed with the movable reinforcing panel having the coupling member shown in FIG. 7A.

FIG. 7C is a sectional side view of a condition in which the opening and displacement of the door panel is restricted.

FIGS. 8A to 8E shows the opening and displacement of the air bag door with the passage of time, in which FIG. 8A is a perspective view of the door panel that is being deformed as the pressing force of the air bag is applied; FIG. 8B is a perspective view of the door panel that is properly moving up as the central tear seam ruptures; FIG. 8C is a perspective view of a condition in which the rupture of the central tear seam is formed; FIG. 8D is a perspective view of a condition in which the opening and displacement of the door panel is started after the rupture of the tear seam is completed; and FIG. 8E is a perspective view of the door panel that has completely been opened.

FIGS. 9A to 9C show the opening and displacement of the air bag door with the passage of time, wherein FIG. 9A shows a condition before the tear seam ruptures; FIG. 9B shows a condition in which the tear seam ruptures simultaneously with the door panel being moved upward as the hinge is extended and deformed; FIG. 9C shows a condition in which while the hinge is deformed inside the bracket, the door panel is opened.

FIGS. 13A and 13B show a conventional air bag door opening structure in cross section, wherein FIG. 13A shows a condition before an air bag door is opened; and FIG. 13B shows an inconvenience in that when a door panel is opened, the end portion of the door panel on its outer edge line side interferes with a panel base.

DETAILED DESCRIPTION OF THE PRESENT INVENTION

Figure 10:
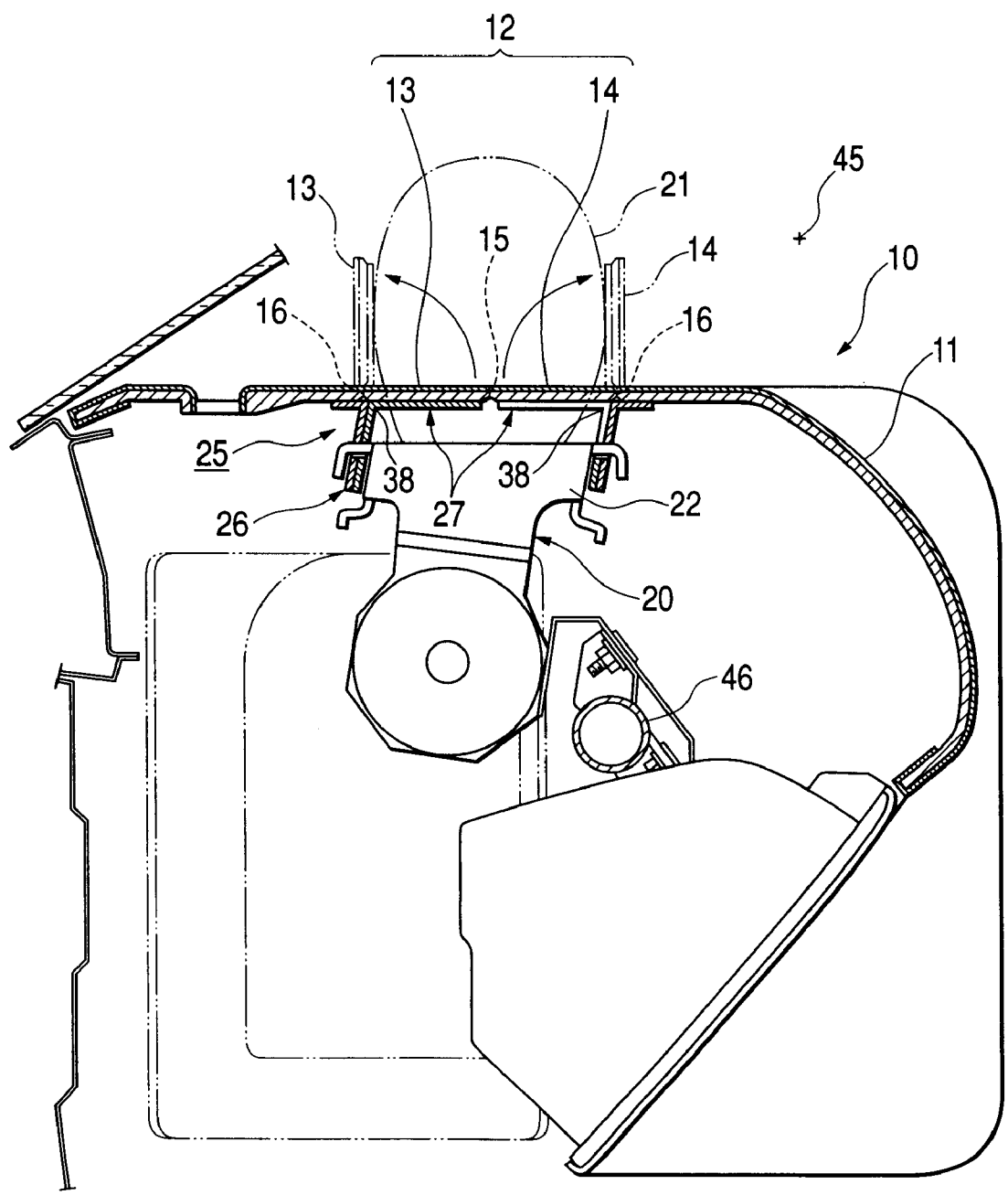
FIG. 10 is a sectional side view of an instrument panel provided with the air bag door.
Figure 11:
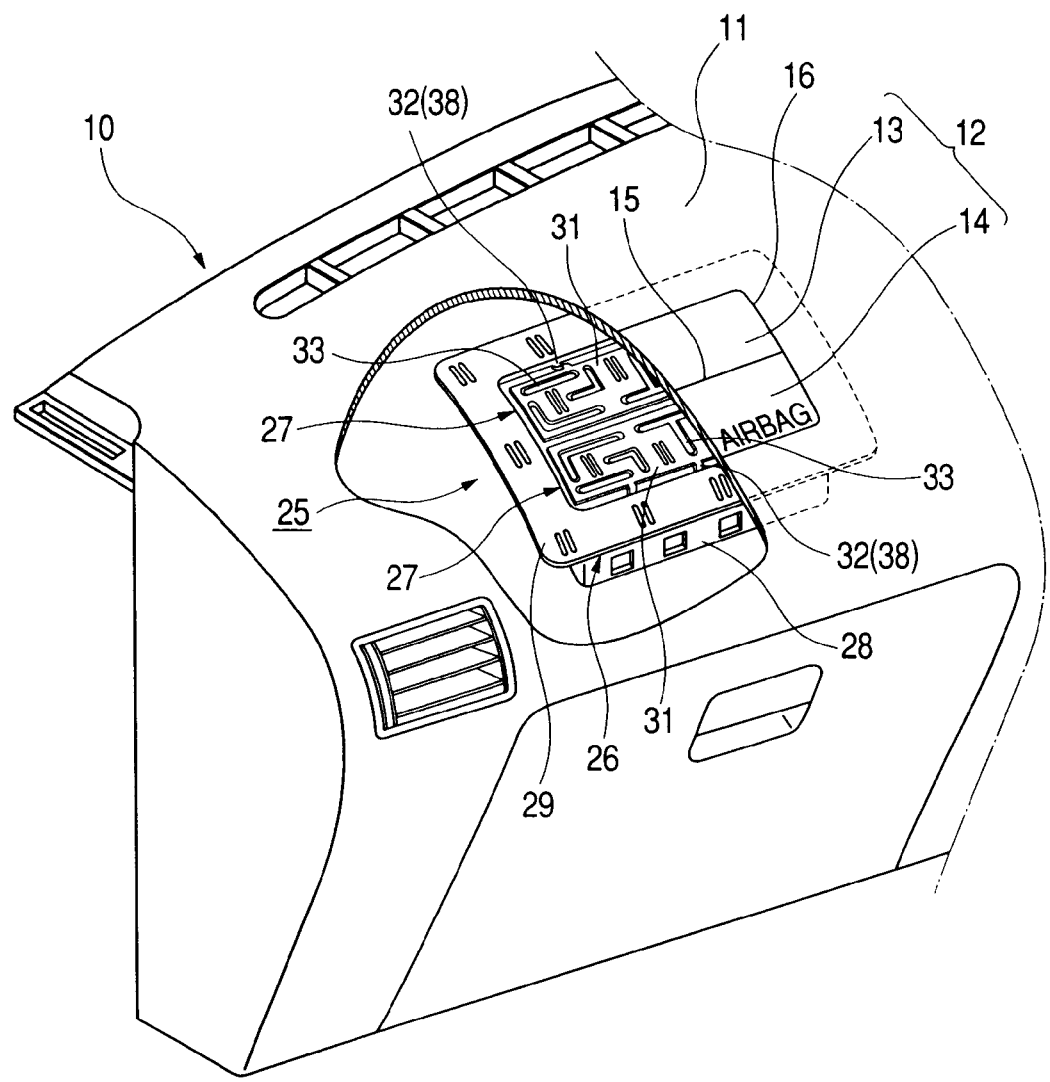
FIG. 11 is a perspective view of the door panels formed in the panel base of the instrument panel and a metal reinforcing member mounted on its back side with the partially exploded panel base.
Figure 12:
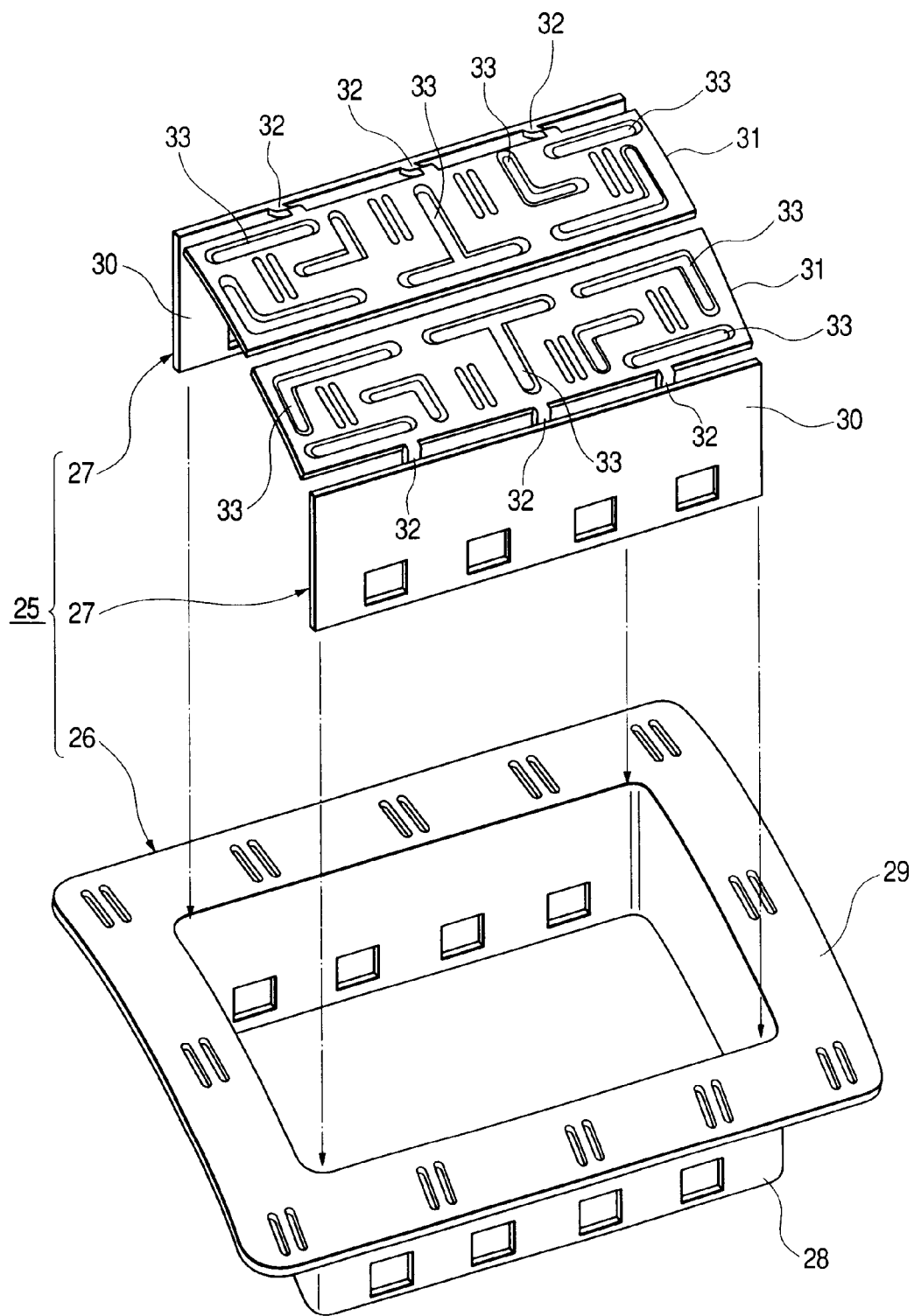
FIG. 12 is an exploded perspective view of the conventional metal reinforcing member shown in FIG. 11.
Figure 13A:
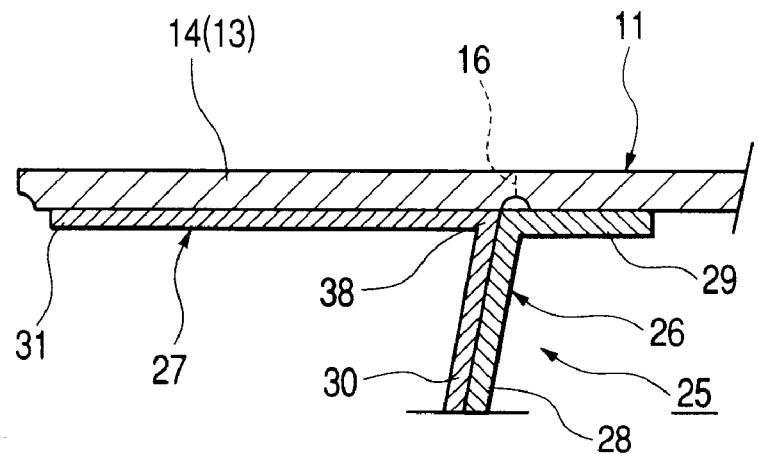
Figure 13B:
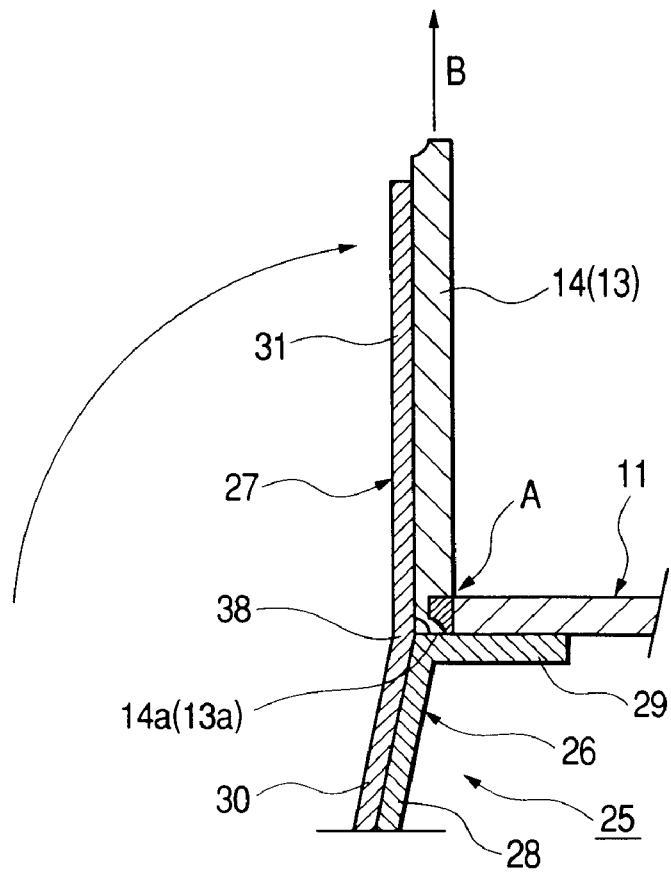

An embodiment of a tear structure of an air bag door according to the invention will now be described with reference to the accompanying drawings. In the embodiment of the invention, the instrument panel 10 shown in FIG. 10 is referred to as a vehicle upholstery member by way of example and like reference numerals designate like members already defined in the description of the prior art with reference to FIGS. 10–12.

Figure 1:
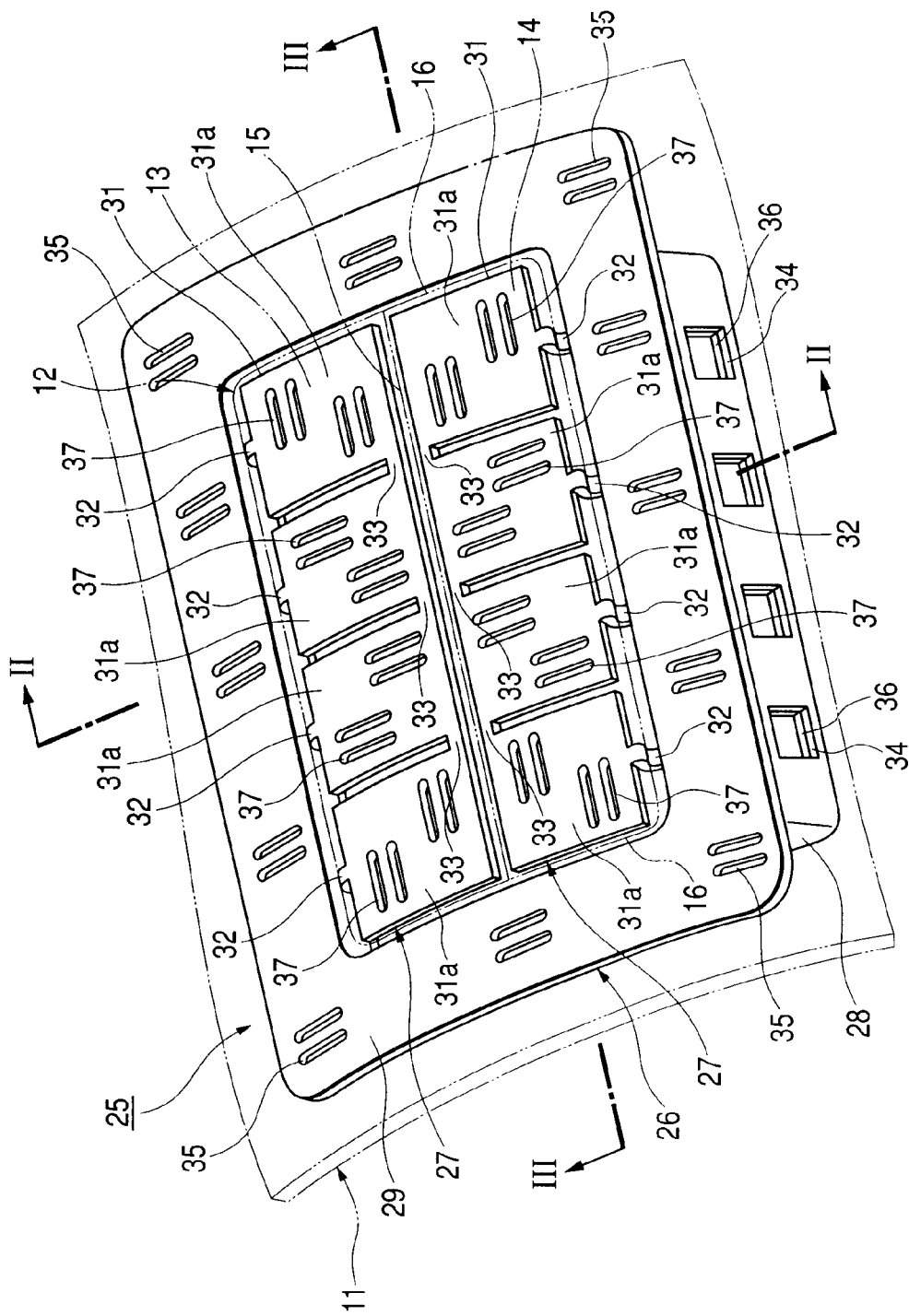
FIG. 1 is a schematic perspective view of a metal reinforcing member for use in a tear structure of an air bag door embodying the present invention, which metal reinforcing member is mounted on the underside of each door panel.
Figure 2:
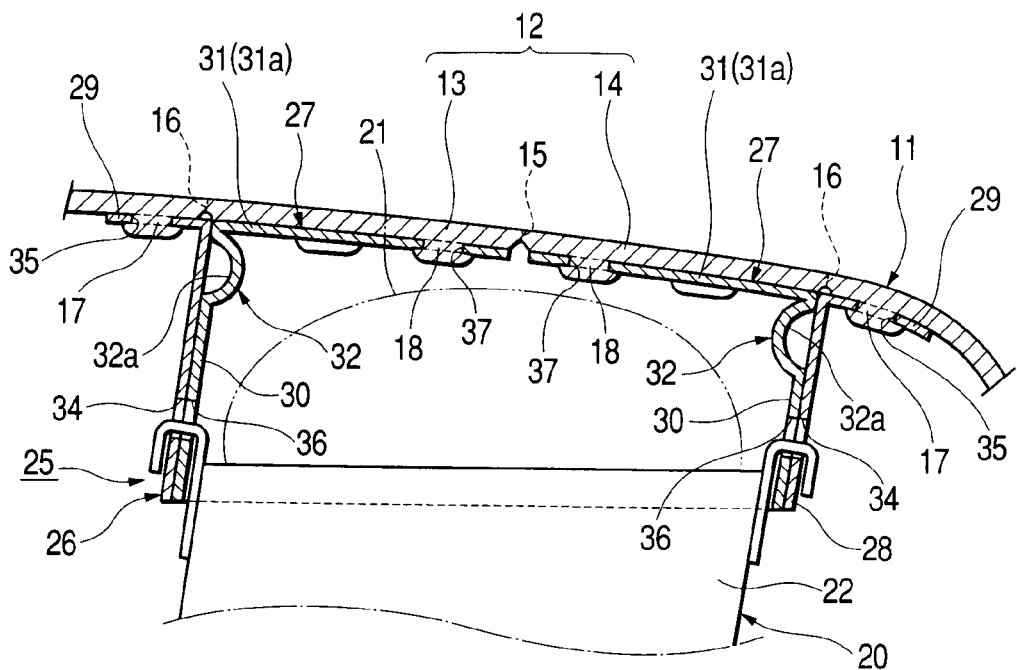
FIG. 2 is a sectional view taken on line II—II of FIG. 1.
Figure 3:
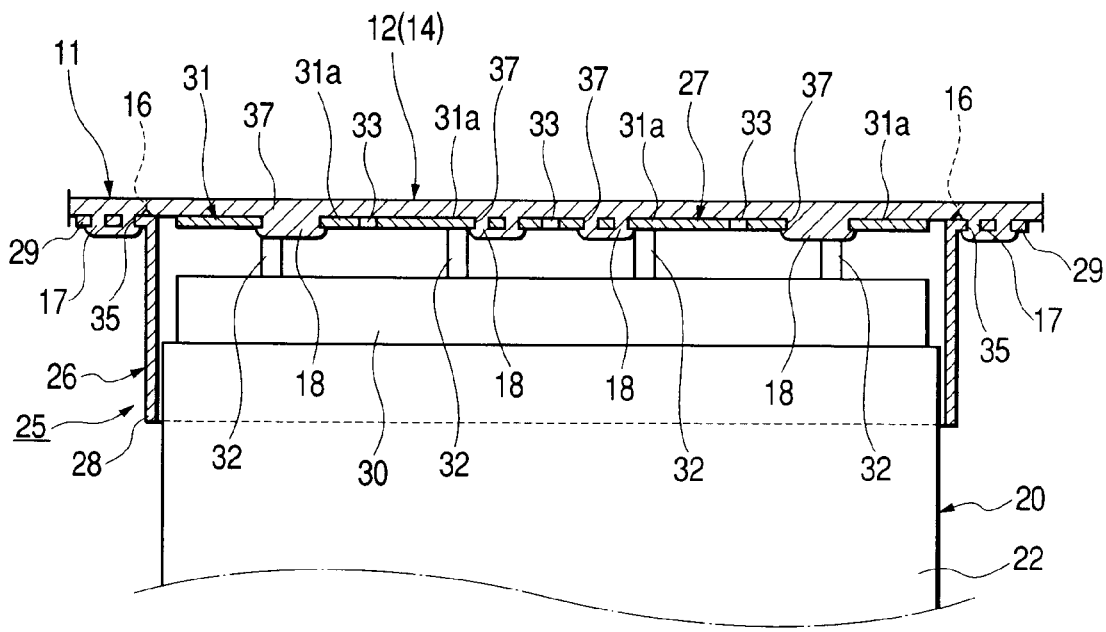
FIG. 3 is a sectional view taken on line III—III of FIG. 1.

FIG. 1 is a schematic perspective view of a tear structure of an air bag door according to the preferred embodiment of the invention with a partially broken segment. FIG. 2 is a sectional view taken on line II—II of FIG. 1; and FIG. 3, a sectional view taken on line III—III. The tear structure of an air bag door according to this embodiment of the invention remains unchanged as long as a central tear seam 15 and an edged tear seam 16 formed on the panel base 11 of an instrument panel 10 as well as an air bag door 12 formed thereby are concerned when compared with the conventional structure shown in FIGS. 10–12; however, part of the form of a metal reinforcing member 25 has been modified. Incidentally, the thickness of the tear seams 15 and 16 is made smaller than that of any other portion so as to facilitate their rupture by forming grooves along the center line between the door panels 13 and 14 of the air bag door 12 and the outer edge lines thereof in the underside of, for example, the panel base 11.

Metal Reinforcing Member

Figure 4:
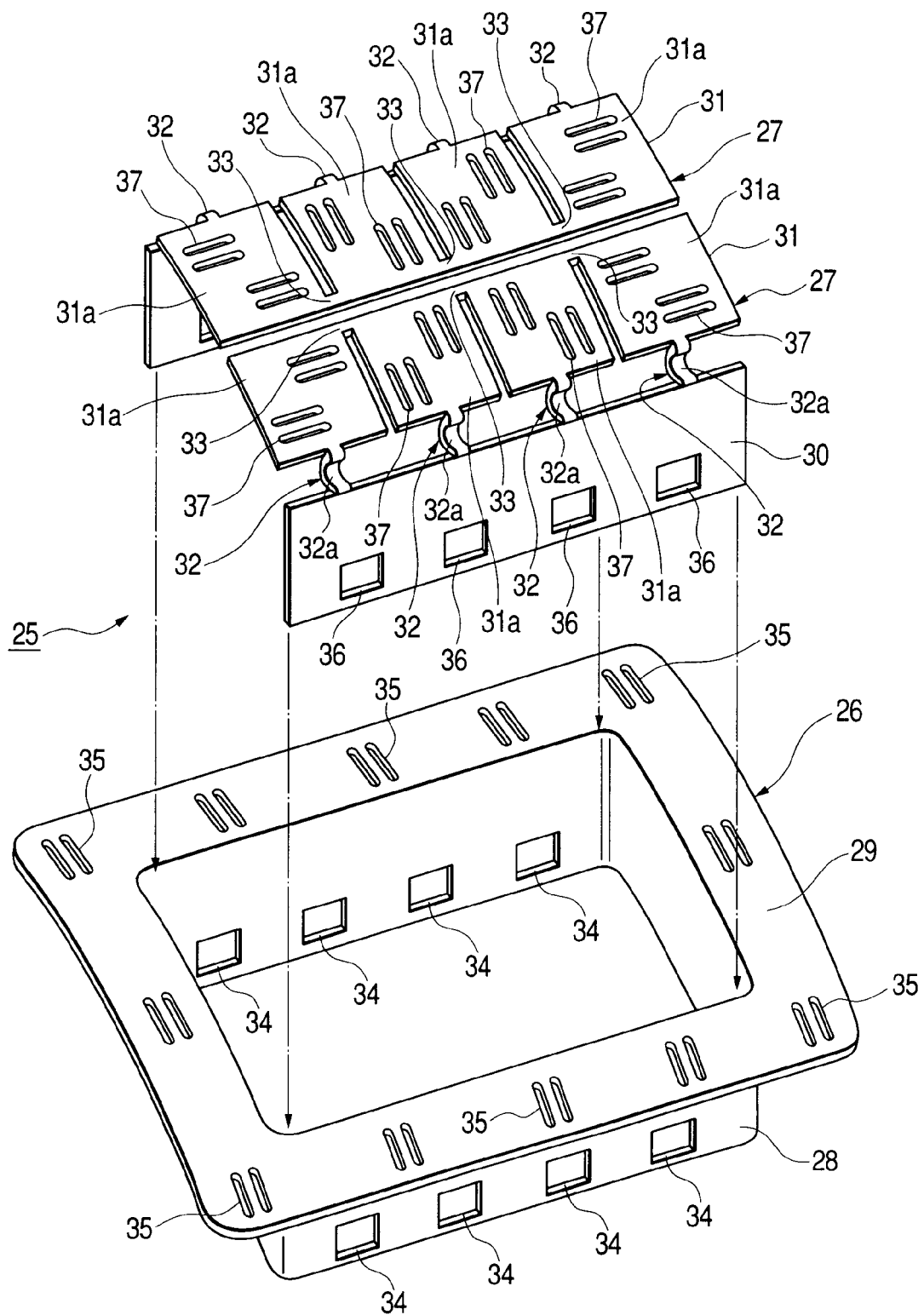
FIG. 4 is an exploded perspective view of a fixing bracket and a movable bracket constituting the metal reinforcing member of FIG. 1.

On condition that there is employed the both-side opening type air bag door 12 having the two sheets of door panels 13 and 14 formed with the tear seams 15 and 16, the metal reinforcing member 25 includes, as shown in FIG. 4, a rectangular frame-like fixing bracket 26 fixed to the panel base 11 in such a manner as to surround the edged tear seam 16, and movable brackets 27 and 27 mounted face-to-face on the inner side of the opening of the fixing bracket 26. The fixing bracket 26 is similar to what is shown in the prior art of FIG. 12 and includes a square tubular portion 28 for retaining and holding the air bag system 20, and a mating plate portion 29 stuck by caulking to the back side of the panel base 11 integrally molded with the tubular portion 28. In this case, the inflator 22 of the air bag system 20 is formed so as to match the tubular portion 28 and a plurality of retaining holes 34 for retaining and holding the air bag system 20 are bored in the opposed walls of the tubular portion 28. Further, a plurality of slit-like engaging holes 35 for respectively allowing ribs 17 protruding from the panel base 11 to pass therethrough are provided.

The movable brackets 27 and 27 correspond to the respective door panels 13 and 14 forming the air bag door 12. Each movable bracket 27 includes a fixing support panel 30 fitted by welding or machine screws to the tubular portion 28 of the fixing bracket 26, and a movable reinforcing panel 31 having four sheets of panel members 31a joined to the fixing support panel 30 with hinges (coupling members) 32. The panel members 31a are a substantially square plate member of the same size and on condition that the door panels 13 and 14 are rectangular and long sideways, the panel members 31a are provided in a serial row in the longer direction of the respective door panels 13 and 14, that is, along turning and bending lines when the door panels 13 and 14 are opened. One panel member 31a is deformably coupled to a next one with a coupling portion 33 for coupling corner portions together on the center line side between the end edge portions of the adjoining panel members 31a, the movable reinforcing panel 31 being formed as a single member. Incidentally, each panel member 31a is provided with a plurality of engaging holes 37 for respectively allowing ribs 18 protruding from the back sides of the corresponding door panels 13 and 14 to pass therethrough. Moreover, each fixing support panel 30 is provided with retaining holes 36 matching the respective retaining holes 34 bored in the tubular portion 28 of the fixing bracket 26.

Hinge Portion

Figure 6A:
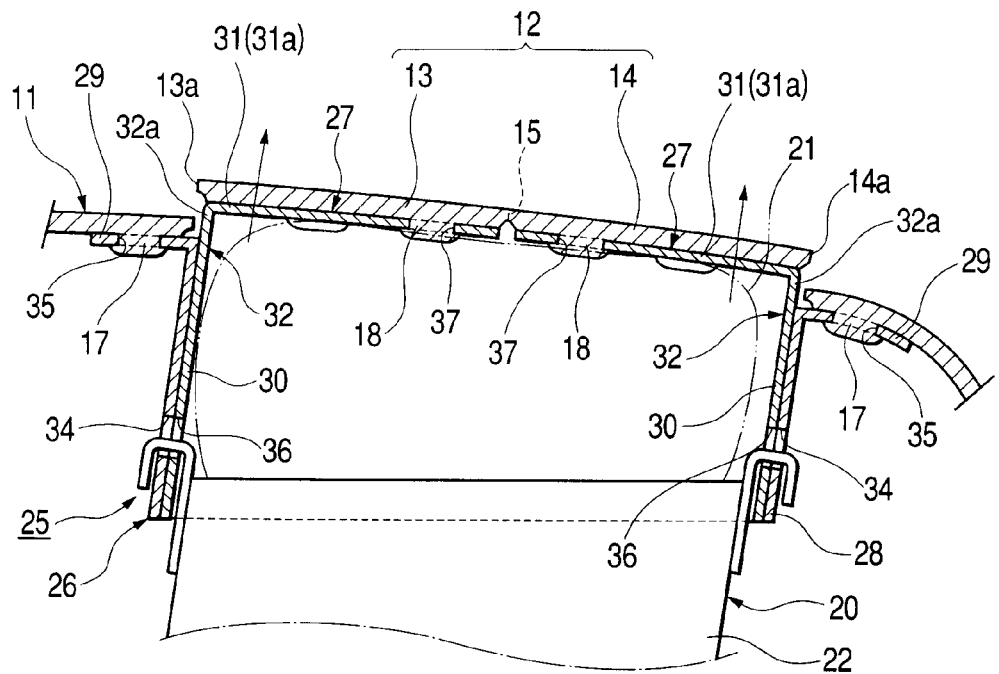
FIG. 6A is a sectional side view of the door panels as a result of the rupture of the edged tear seam when coupling members are extended and deformed because of the pressing force of the inflating air bag.
Figure 6B:
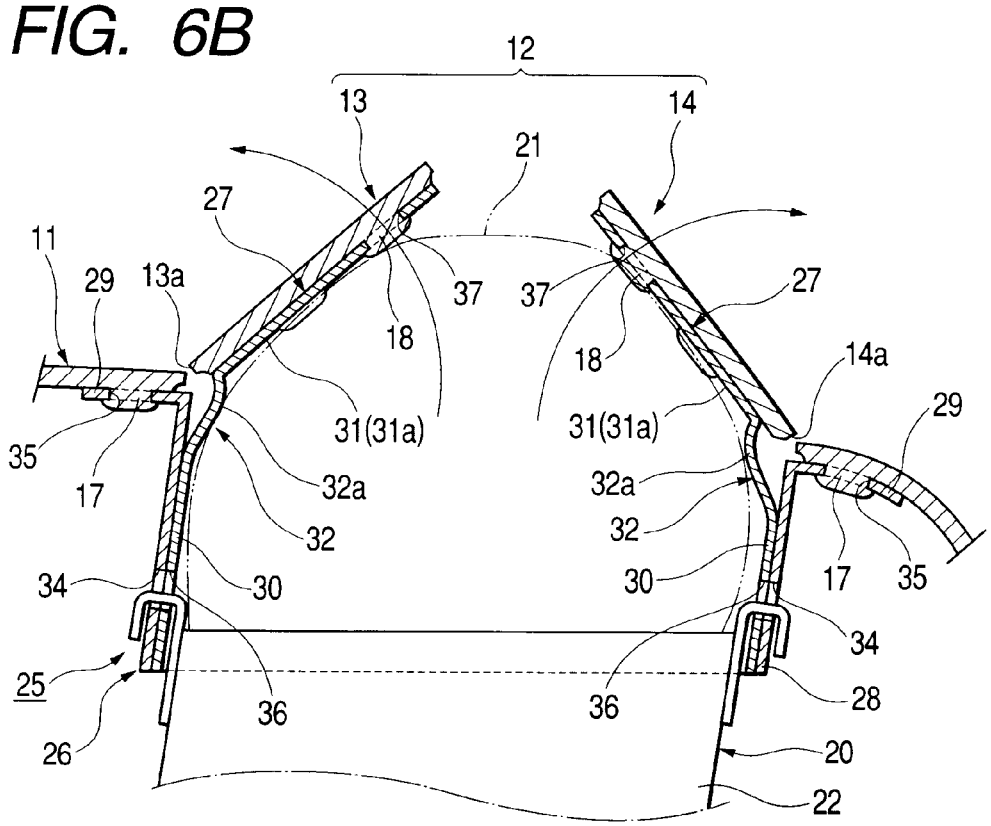
FIG. 6B is a sectional side view of the door panels starting to open around the respective coupling members when a central tear seam ruptures because of the increasing pressing force of the air bag.
Figure 9A:
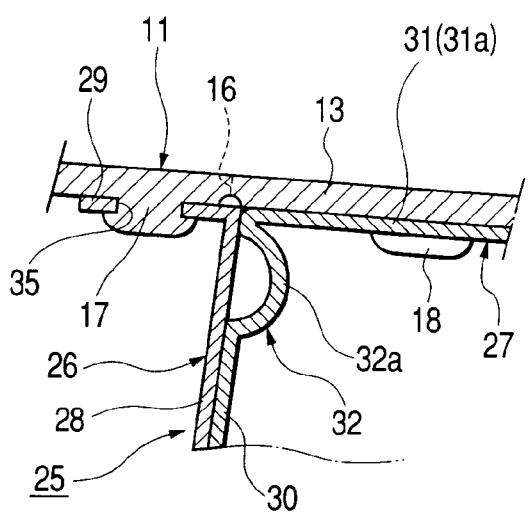
Figure 9B:
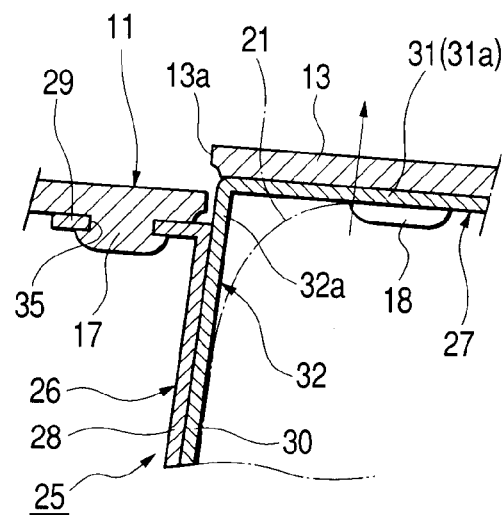
Figure 9C:
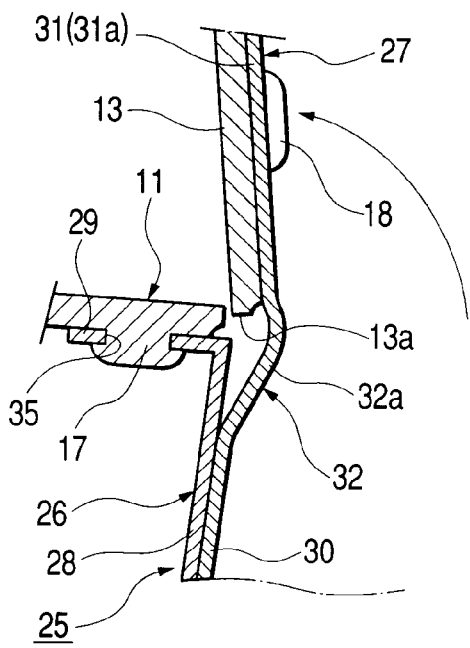
Figure 9D:
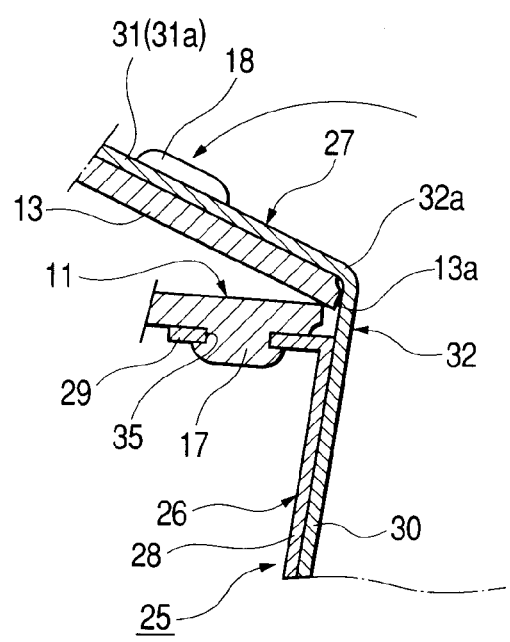
FIG. 9D shows a condition in which the opening and displacement of the door panel is restricted because of the completely extended hinge.

As shown in FIGS. 2, 6A, 6B and 9A, the serial row of hinges 32 for coupling the panel members 31a and the fixing support panel 30 together are in the form of a belt having a semi-arcuate loosening portion 32a projecting toward the inner side of the tubular portion 28 of the fixing bracket 26. Both the arcuate ends of each loosening portion 32a are provided close to the inner wall surface of the tubular portion 28. Consequently, when the inflating air bag 21 presses the panel members 31a from the inside as the air bag system 20 operates, each of the loosening portions 32a is linearly extended and deformed as shown in FIGS. 6A and 9B whereby to allow the edged tear seam 16 to rupture and also to allow the door panels 13 and 14 to move up to the extent that the loosening portion 32a is deformed from the arcuate condition to the linear condition. When the loosening portion 32a of each hinge 32 is extended and deformed completely by the pressing force of the air bag 21, however, the door panels 13 and 14 are allowed to project from the outside of the panel base 11 to the extend of the thickness of the door panels 13 and 14 as shown in FIG. 9B so as to prevent the end portions 13a and 14a of the door panels 13 and 14 from strongly interfering with the rest portion of the panel base 11. As shown in FIG. 9D, further, the length of the loosening portions 32a is set so that the door panels 13 and 14 may be positioned to prevent the door panels 13 and 14 from obstructing the overall development of the air bag 21 toward the passenger's chamber 45 and that when the door panels 13 and 14 are opened and displaced up to a position where the door panels 13 and 14 are prevented from colliding with the surface of the panel base 11, the loosening portions 32a may completely be extended to restrict the further opening and displacement of the door panels 13 and 14.

The hinge 32 is extendable substantially vertically along the tubular portion 28 of the fixing bracket 26 as shown in the drawings and as its upper end portion is positioned in the uppermost end edge of the tubular portion 28, the panel members 31a of the movable reinforcing panels 31 fixed to the respective door panels 13 and 14 are made extendable up to the end portions 13a and 14a on the outer edge line sides of the corresponding door panels 13 and 14. Since the loosening portion 32a of each hinge 32 is curved semi-arcuately toward the inside of the tubular portion 28, moreover, the loosening portion 32a is separated temporarily from the inner wall surface of the tubular portion 28 and properly displaced inside as shown in FIG. 9C in the process from the floating condition of FIG. 9B up to the completely opened condition of FIG. 9D, so that the door panels 13 and 14 are opened and displaced in this state. Therefore, even though the length of the loosening portions 32a of the hinges 32 is set to what satisfied the above conditions, the end portions 13a and 14a of the door panels 13 and 14 are properly prevented from interfering with the panel base 11.

However, the hinges 32 never assure the pivotal displacement of the movable reinforcing panels 31 a plurality of times with respect to the fixing support panels 30 but allow the movable reinforcing panels 31 to be opened and displaced once when the hinges 32 are pressed upward by the air bag 21 after the air bag system 20 is actuated. Further, the hinges 32 are set so as not to build up resistance to the rupture of the edged tear seam 16 when pressing force necessary for the rupture of at least the edged tear seam 16 is applied to the corresponding panel members 31a. Moreover, the hinges 32 are made strong enough not to break even when they are completely extended upon the opening of the door panels 13 and 14.

Function of the Embodiment of the Invention

The function of the tear structure of the air bag door using the metal reinforcing member arranged as described above.

Fixing to the Panel Base

The metal reinforcing member 25 houses the movable brackets 27 and 27 respectively having the movable reinforcing panels 31 and 31 facing each other on the inside of the tubular portion 28 in the fixing bracket 26 and each of the fixing support panels 30 and 30 is fitted by welding or machine screws to the inside of the tubular portion 28. The metal reinforcing member 25 thus arranged is firmly mounted on the panel base 11 by letting the ribs 17 and 18 protruded on the periphery of the back side of the air bag door 12 in the panel base 11 pass through the respective engaging holes 35 and 37 and caulking the heads of the respective ribs 17 and 18 (see FIGS. 2 and 3). At this time, the mating plate portion 29 of the fixing bracket 26 is fixedly provided along the outer periphery of the air bag door 12 (edged tear seam 16). The panel members 31a of the movable bracket 27 on one side are fixed to the underside of the door panel 13 on one side of the air bag door 12, whereas the panel members 31a of the movable bracket 27 on the other side are fixed to the underside of the door panel 14 on the other side thereof. When the instrument panel 10 mounted with the metal reinforcing member 25 is mounted in the vehicle body, the inflator 22 of the air bag system 20 fixed to a reinforcing bar 46, for example, matches the tubular portion 28 of the fixing bracket 26 and is retained by utilizing the retaining holes 34 and 36.

Operation of the Air Bag System

Figure 5A:
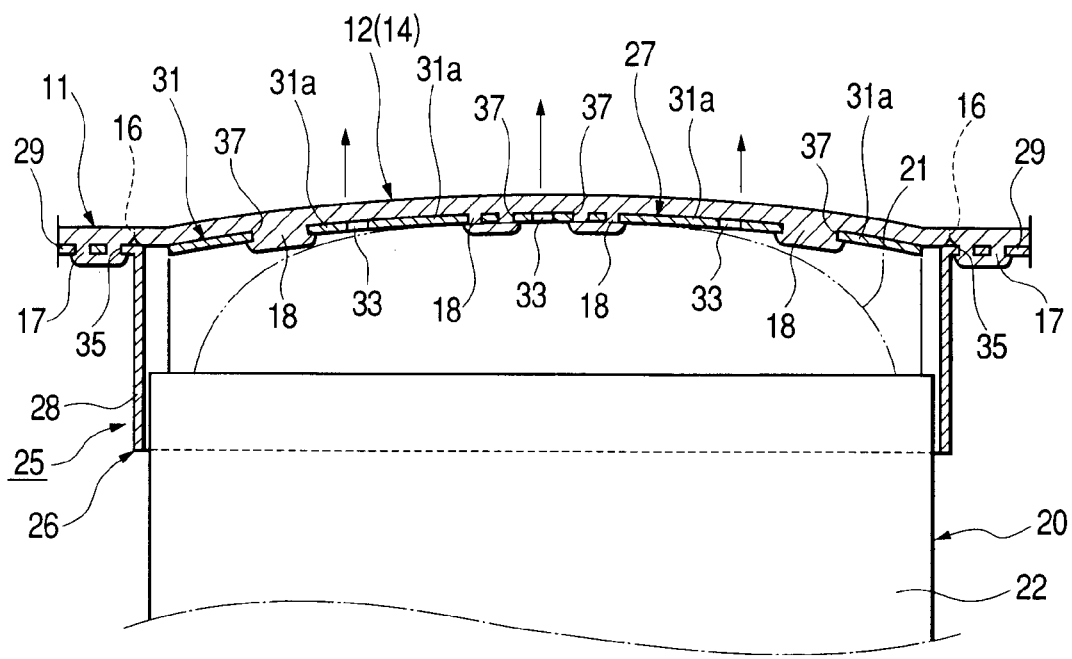
FIG. 5A is a sectional elevational view of the door panels that are deformed outward before being ruptured because of the pressing force of an inflating air bag.
Figure 8A:
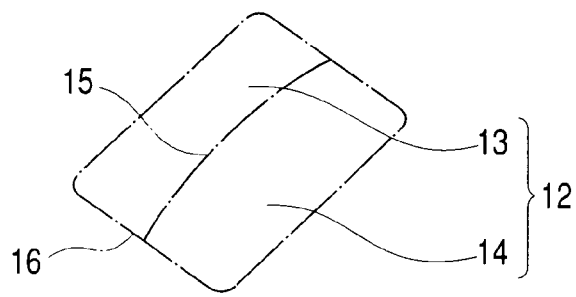

When the air bag system 20 is actuated on condition that the metal reinforcing member 25 has been mounted, the air bag 21 starts inflating in such a form that the central portion of its upper surface is protruding. Consequently, the upper surface of the air bag 21 is first brought into contact with the two sheets of panel members 31a particularly positioned inside out of the four sheets of panel members 31a of each movable reinforcing panel 31. Therefore, these inside panel members 31a are pressed upward by the air bag 21 (see FIGS. 5A and 8A).

Rupture of the Edged Tear Seam

With respect to the inside movable reinforcing panels 31a supplied with necessary pressing force with the sides of the central tear seam 15 coupled together by the respective ranging portions 33 to the outside panel members 31a positioned outward and set to be hardly deformed, the hinges 32 are readily deformable upward. Thus, the substantially central outer edge lines corresponding to the hinges 32 of the inside panel members 31a of the door panels 13 and 14 are pushed upward and deformed outward. Ultimately, the substantially central region of the long side portion of the edged tear seam 16 is caused to partially rupture, whereby the loosing portions 32a of the respective hinges 32 corresponding to the inside panel members 31a are extended and deformed when the outer edge lines of the door panels 13 and 14 are moved up and deformed as the edged tear seam 16 ruptures.

Figure 5B:
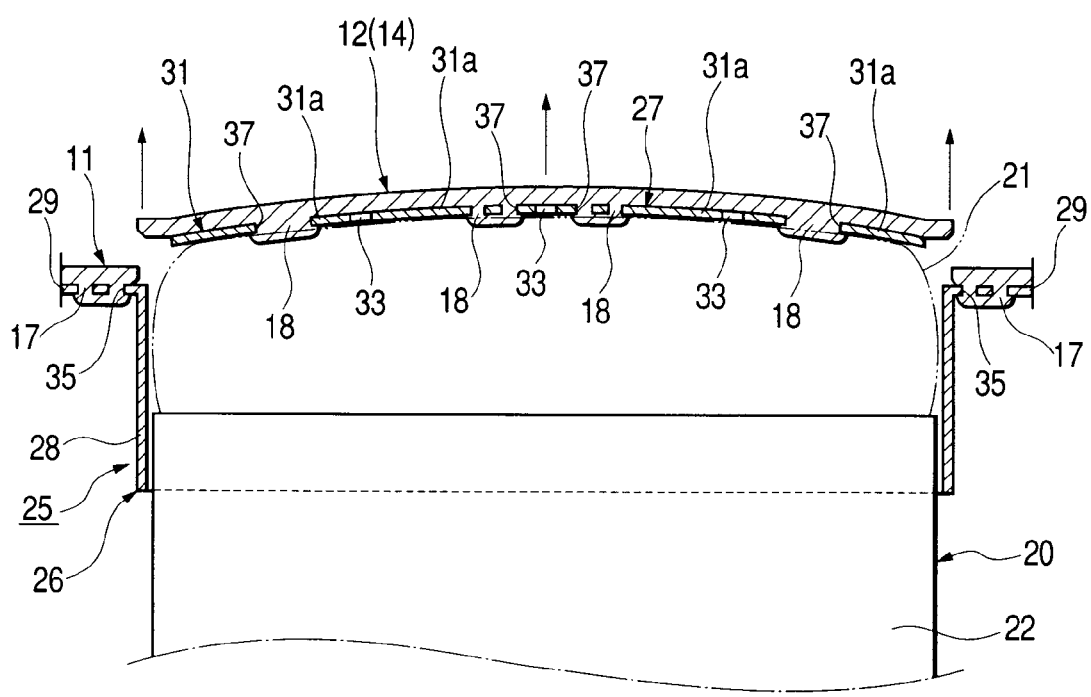
FIG. 5B is a sectional elevational view of the door panels that start to open when an edged tear seam ruptures because of the pressing force of the further inflating air bag.
Figure 8B:
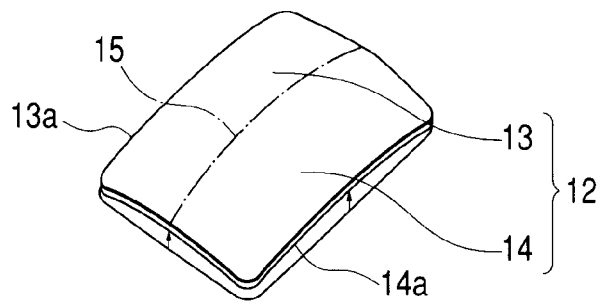

After the partial rupture occurs in the vicinity of the central long side portion of the edged tear seam 16, the hinges 32 of the panel members 31a positioned outward are also successively displaced upward as the pressing force due to the inflation of the air bag 21 increases. Consequently, the rupture of the edged tear seam 16 progresses to both the left and right lateral sides of the long side portion and subsequently progresses round the short side portion. Then the overall rupture of the edged tear seam 16 occurs at a stretch (FIGS. 5B and 8B). All the hinges 32 are now extended and deformed at a point of time the rupture of the edged tear seam 16 is completed because of the pressing force of the air bag 21. However, the rupture of the central tear seam 15 is not started yet in such a condition that both the door panels 13 and 14 are moved up from the panel base 11 by only a predetermined amount.

Rupture of the Central Tear Seam

Figure 8C:
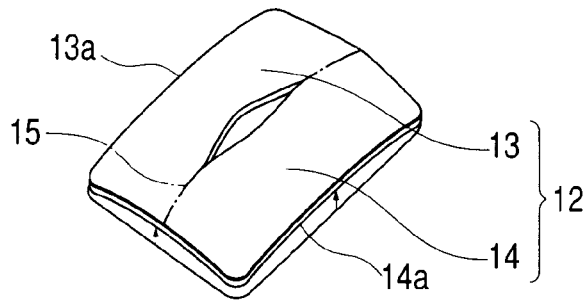

When the rupture of the edged tear seam 16 is completed, that of the central tear seam 15 occurs next. Although the panel members 31a are coupled together by the respective ranging portions 33 and set to be hardly deformed individually, strong pressing force has already been applied to each of the inside panel members 31a since the air bag 21 inflates with its upper central surface being protruded. Therefore, as the vicinity of the central line of each of the door panels 13 and 14 is deformed most outwardly, rupture partially first occurs in the vicinity of the central tear seam 15 closest to the deforming region (FIG. 8C). When partial rupture occurs to the central region of the central tear seam 15, the overall rupture of the central tear seam 15 progresses at a stretch with an increase in the pressing force of the inflating air bag 21.

Opening and Displacement of the Door Panels

Figure 8D:
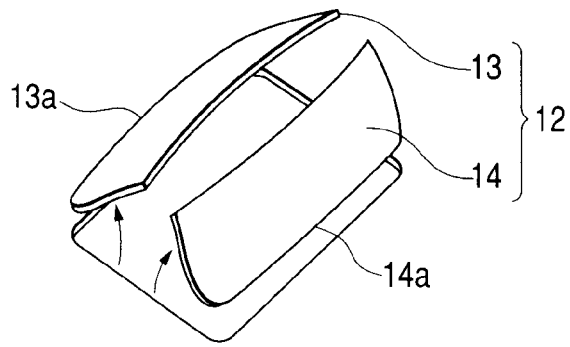

Thus, the rupture first occurs in the vicinity of the central long side portion of the edged tear seam 16 and proceeds at a stretch into the whole long side portion and then the whole short side portion of the edged tear seam 16. Further, the rupture occurs in the vicinity of the central tear seam 15 and then proceeds at a stretch into the whole central tear seam 15 whereby to complete the rupture operation, so that the opening and displacement of the door panels 13 and 14 of the air bag door 12 are allowed with respect to the panel base 11. While being pressed upward by the inflating air bag 21, both the door panels 13 and 14 are opened at a stretch toward the passenger chamber 45 (see FIGS. 6B and 8D). Since the loosening portion 32a of each hinge 32 is separated from the inner wall surface of the tubular portion 28 of the fixing bracket 26 and properly displaced inside as shown in FIG. 9C, with the progress of the opening and displacement of the door panels 13 and 14 in this state, the end portions 13a and 14a of the respective door panels 13 and 14 are properly prevented from interfering with the panel base 11, the door panels 13 and 14 are smoothly opened and displaced.

Restriction of the Opening of the Door Panels

Figure 8E:
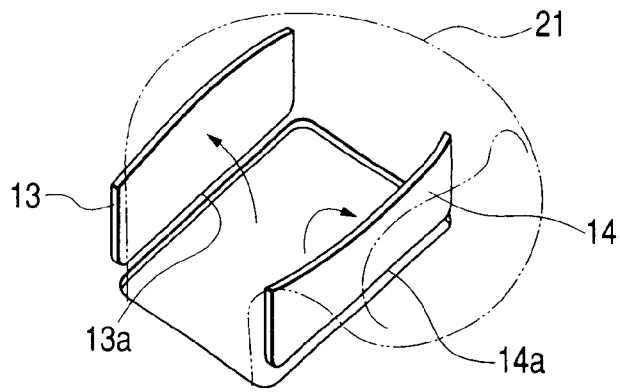

When the door panels 13 and 14 are opened and displaced up to a desired angle at which the overall development of the air bag 21 toward the passenger's chamber 45 is unobstructed, the loosening portions 32a of the respective hinges 32 become completely extended. As shown in FIG. 9(d), the end portions 13a and 14a of the respective door panels 13 and 14 are then brought into contact with the panel base 11 and restricted to their opening and displacement further; with this restriction, the door panels 13 and 14 are prevented from colliding with the outer surface of the panel base 11. Further, the door panels 13 and 14 are opened and displaced up to the opening position, whereby the overall development of the air bag 21 toward the passenger's chamber 45 is made achievable (FIG. 8E).

In the tear structure of an air bag door according to this embodiment of the invention, each of the movable reinforcing panels 31 and 31 in the metal reinforcing member 25 is formed with the four sheets of panel members 31a, which causes the individual panel members 31a to be posture-deformed in proportion to the intensity of the pressing force of the air bag 21, so that the air bag 21 is allowed to partially deformed. Since the central line side of the panel members 31a are coupled together by the respective ranging portions 33, their individual deformation on the central line side is restricted, however, as their outer edge lines (on the side of the hinge portion 32) are not mutually coupled together, individual deformation on their outer edge lines is possible, so that the outer edge line sides are easily deformable. Thus, partial rupture is caused in the vicinity of the edged tear seam 16 at the initial pressing stage resulting from the inflation of the air bag 21 and the overall rupture of the edged tear seam 16 progresses at a stretch and this is followed by partial rupture in the vicinity of the central tear seam 15. Further, the overall rupture of the central tear seam 15 progresses at a stretch. Therefore, the air bag door 12 can be opened and displaced at quicker timing with lower pressing force than those of the conventional air bag door 12 shown in FIG. 11. As the air bag door 12 is opened and displaced smoothly, moreover, the overall development of the air bag 21 is carried out without any impediment and improper damage to the air bag door 12.

The door panels 13 and 14 are thus moved upward by the respective hinges 32 before being opened and displaced and as the end portions 13a and 14a do not strongly interfere with the panel base 11 then. Consequently, the ribs 18 used to fix movable reinforcing panels 31 by caulking to the door panels 13 and 14 are prevented from being broken, which properly prevents the movable reinforcing panels 31 from being separated from the door panels 13 and 14 and also prevents the door panels 13 and 14 and their end portions 13a and 14a from being damaged. As the door panels 13 and 14 are never caused to collide with the panel base 11 because of the hinges 32, the door panels 13 and 14 and the panel base 11 are prevented from being damaged by any impact resulting from the collision.

In the tear structure of an air bag door according to this embodiment of the invention, the four sheets of panel members 31a are employed for forming each of the movable reinforcing panels 31 and 31 in the metal reinforcing member 25. When the pressing force of the air bag 21 is applied to the panel members 31a, the panel members 31a are subjected to posture deformation according to the intensity of the pressing force, so that partial deformation occurs in the vicinity of the central long side portion of the edged tear seam 16; with this, the total rupture of the edged tear seam 16 proceeds at a stretch. Partial rupture subsequently occurs in the vicinity of the center of the central tear seam 15 and with this, the total rupture of the central tear seam 15 proceeds at a stretch. It is therefore possible to open and displace the air bag door 12 at quicker timing in comparison with any conventionally-arranged one. Moreover, the smooth opening and displacement of the air bag door 12 sets free the overall development of the air bag 21 from any impediment and also properly prevents the air bag door 12 from being damaged.

Another Embodiment

FIGS. 7A and 7B are a perspective and a sectional view of the principal part according to another embodiment of the invention in that when the air bag 21 presses each of the panel members 31a, the door panels 13 and 14 are pressed upward by moving bending line sides of the panel members 31a toward the door panels 13 and 14 to open the door panels 13 and 14 outward.

According to the preceding embodiment of the invention, it has been arranged that when the panel members 31a receive the pressing force of the air bag 21, the loosening portions 32a of the semi-arcuate hinges 32 are linearly extended and deformed whereby to allow the door panels 13 and 14 to move upward, whereas each of the panel members 31a according to this embodiment of the invention is provided on condition that a coupling member 32 is in the form of a belt-like flat plate and movably incorporated in the tubular portion 28 of the fixing bracket 26 as shown in FIG. 7A. The coupling member 32 comprises a retaining hole 41a for allowing the shaft 40a of a bolt 40 to pass therethrough and a thin long guide groove 41b properly smaller in diameter than the shaft 40a and is formed with a long narrow slit 41 extending along the direction in which the coupling member 32 slides. Further, each panel member 31a is usually fitted to the fixing bracket 26 by passing the bolt 40 through the retaining hole 41a. When the pressing force of the air bag 21 is applied to the panel member 31a, the bolt 40 is relatively moved toward the guide groove 41b to allow the coupling member 32 to move upward as shown in FIG. 7B, whereby the panel member 31a is made movable upward.

The length of each of the extended loosening portions for determining the slide amount of the coupling members 32 is set to position the door panels so as to prevent the door panels from obstructing the overall development of the air bag toward the passenger's chamber 45 and also to allow the door panels to be opened and displaced up to a position where the door panels are prevented from colliding with the surface of the panel base when the door panels 13 and 14 are opened and displaced (FIG. 7C). With the coupling members 32 even in the modified embodiment of the invention, as the portion extended upward from each bolt 40 is separated from the inner wall surface of the tubular portion 28 of the fixing bracket 26 in the inside direction so as to be properly deformed, the end portions 13a and 14a of the respective door panels 13 and 14 are prevented from interfering with the panel base 11 when the door panels 13 and 14 are opened and displaced.

Although the movable reinforcing panel 31 of each movable bracket 27 has been composed of the four sheets of serially-combined panel members 31a by way of example according to the preceding embodiment of the invention, the number of panel members 31a is not limited but may have three or five sheets or more of panel members depending on the shape and size of each of the door panels 13 and 14.

In case where the movable reinforcing panel 31 is formed with a plurality of panel members 31a, however, it is preferable to use the ranging portions 33 to serially couple the panel members 31a together; this is because, in case where the panel members 31a are completely separately formed without providing the ranging portions 33 therebetween, it is feared that there occurs inconvenience arising from the accidental damage of the door panels 13 and 14 due to an impact when the door panels 13 and 14 are pressed upward by the air bag 21. On condition that the rupture of the edged tear seam 16 is caused to proceed further, moreover, each ranging portion 33 is preferably provided on the central line side between the panel members 31a.

As such a vehicle upholstery member having an air bag door, there are a door panel, a pillar garnish and the like other than an instrument panel, and the tear structure of the air bag door according to the invention is also suitably applicable to the air bag door provided to these vehicle upholstery members.

As set forth above, the tear structure of the air bag door according to the invention is such that the movable reinforcing panels are respectively formed with the plurality of serially-combined panel members, whereby when the air bag starting to inflate after the operation of the air bag system presses any one of the panel members upward in the movable reinforcing panels, the regions corresponding to the panel members of the door panels are individually deformed outward and the tear seams situated closest to the deformed regions are caused to partially rupture in order to prompt the total rupture of these tear seams. Therefore, the invention is of use and effective in that the air bag door can be opened and displaced at quicker timing with lower pressing force than those of the conventional air bag door. Moreover, as the door panels are smoothly opened and displaced, no trouble occurs to the development of the air bag with the advantage of suitably avoiding the damage of the door panels.

Moreover, the air bag door opening structure according to the invention is arranged so that when the door panels with the respective movable reinforcing panels fixed thereto are opened and displaced up to the position where the overall development of the air bag is not obstructed and where the door panels are set free from colliding with the surface of the panel base, the coupling members for coupling the movable reinforcing panels and the bracket are completely extended to restrict the further opening and displacement of the door panels. Thus, the invention demonstrates the effect of properly preventing the door panels and the panel base from being damaged by the impact at the time of collision since the door panels are made free from colliding with the panel base.

Further, the air bag door opening structure according to the invention is arranged so that when the door panels with the respective movable reinforcing panels fixed thereto are opened and displaced up to the position where the overall development of the air bag is not obstructed and where the door panels are set free from colliding with the surface of the panel base, the sliding displacement of the coupling members for coupling the movable reinforcing panels and the bracket are stopped to restrict the further opening and displacement of the door panels. Thus, the invention also demonstrates the effect of properly preventing the door panels and the panel base from being damaged by the impact at the time of collision since the door panels are made free from colliding with the panel base.

What is claimed is:

1. An air bag door comprising:
   two door panels integrally formed with a panel base of a vehicle upholstery member and opened to both sides when an air bag system including an air bag is actuated;
   a bracket disposed on the back side of the panel base;
   two movable reinforcing panels fitted to the bracket to be openable to both sides and fixed to the back sides of the door panels, respectively;
   wherein a tear seam is defined along with a center line between the two door panels and along an outer edge lines of the door panels;
   when the air bag starting to inflate after actuating the air bag system presses the movable reinforcing panels upward from the inside, the tear seam ruptures to open and displace the door panels toward a passenger's chamber to totally develop the air bag toward the passenger's chamber;
   each of the movable reinforcing panels comprises a plurality of panel members combined in serial with each other and disposed along a bending line for opening the door panels; and
   when the air bag starting to inflate after the operation of the air bag system presses any one of the panel members upward in the movable reinforcing panels, regions corresponding to the panel members of the door panels are deformed outward and the tear seam situated closest to the regions deformed is caused to partially rupture to prompt the total rupture of these tear seams.

2. The air bag door as claimed in claim 1, wherein each of the movable reinforcing members comprises a first deformable connecting portion partially and serially connecting the panel members with the adjacent panel members; and
   a second deformable connecting portion connecting the panel members to the bracket.

3. An air bag door comprising:
   a door panel integrally formed with a panel base of a vehicle upholstery member;
   a bracket disposed on the back side of the panel base; and
   a movable reinforcing panel having a coupling member, the movable reinforcing panel fitted to the bracket through the coupling member to be openable to the inside of a passenger's chamber and fixed to the back side of the door panel;
   wherein the movable reinforcing panel comprises a plurality of small rectangular door panel members arranged in serial with each other along a longitudinal direction of the door panel,
   wherein a plurality of deformable connecting portions connect adjacent small rectangular door panel members with each other to form the serial arrangement of the plurality of panel members of the movable reinforcing panel.

4. The air bag door of claim 3, wherein the coupling members comprise a plurality of deformable coupling members that connect the plurality of panel members to the bracket, respectively.

5. The air bag door of claim 3, wherein each of the plurality of panel members has a slit.

6. The air bag door of claim 3, wherein the coupling member has a loosening portion to be deformable to extend in straight when an air bag pushes the door panel from the back side of the door panel.

7. The air bag door of claim 6, wherein the loosening portion is formed in an arc shape.

8. The air bag door of claim 7, wherein both ends of the loosening portion of coupling member are positioned close to the inner wall surface of the bracket.

9. The air bag door of claim 3, wherein the coupling member comprises:
   a plate having a slit; and
   a bolt inserted in the slit and slidably fixing the plate to the bracket.

10. The air bag door of claim 9, wherein the bolt is allowed to slidably move from one end to the other end of the slit.

11. The air bag door of claim 10, the length of the slit is set to position the door panel to be prevented from obstructing the overall development of the air bag, and to be opened and displaced up to a position where the door panel is prevented from colliding with the surface of the panel base.

12. The air bag door of claim 3, wherein the door panel comprises two door panels; and
    the movable reinforcing member comprises two movable reinforcing panels fixed to the back side of the door panels, respectively.

13. The air bag door of claim 12, wherein the coupling member comprises:
    a plurality of first coupling members for fitting one of the movable reinforcing members to bracket, and
    a plurality of second coupling members for fitting the other of the movable reinforcing members to the bracket, the second coupling members facing the first coupling members.

14. The air bag door of claim 3, wherein a tear seam is formed on the backside of the panel base to define the door panel to easily develop the air bag in the passenger's chamber.

* * * * *